US011131490B2

(12) United States Patent
Ueda et al.

(10) Patent No.: US 11,131,490 B2
(45) Date of Patent: Sep. 28, 2021

(54) REFRIGERATION DEVICE HAVING CONDENSER UNIT CONNECTED TO COMPRESSOR UNIT WITH ON-SITE PIPE INTERPOSED THEREBETWEEN AND REMOTE FROM THE COMPRESSOR UNIT

(71) Applicant: Mitsubishi Electric Corporation, Tokyo (JP)

(72) Inventors: Kohei Ueda, Tokyo (JP); Abastari, Tokyo (JP); Hiroshi Sata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 16/084,704

(22) PCT Filed: May 9, 2016

(86) PCT No.: PCT/JP2016/063741
§ 371 (c)(1),
(2) Date: Sep. 13, 2018

(87) PCT Pub. No.: WO2017/195248
PCT Pub. Date: Nov. 16, 2017

(65) Prior Publication Data
US 2019/0203995 A1 Jul. 4, 2019

(51) Int. Cl.
*F25B 40/02* (2006.01)
*F25B 49/02* (2006.01)

(52) U.S. Cl.
CPC .............. *F25B 49/02* (2013.01); *F25B 40/02* (2013.01); *F25B 2400/05* (2013.01);
(Continued)

(58) Field of Classification Search
CPC  F25B 2400/05; F25B 2400/054; F25B 40/02; F25B 2600/05; F25B 49/02;
(Continued)

(56) References Cited

U.S. PATENT DOCUMENTS 9,851,280 B2 * 12/2017 Son ..................... G01M 99/005
2006/0016206 A1 * 1/2006 Gist .......................... F25C 5/10
62/340
(Continued)

FOREIGN PATENT DOCUMENTS

JP 2005-233505 A 9/2005
JP 2008-196829 A 8/2008
(Continued)

OTHER PUBLICATIONS

Office Action dated Jul. 2, 2019 issued in corresponding JP patent application No. 2018-516228 (and English translation).
(Continued)

*Primary Examiner* — Cassey D Bauer
*Assistant Examiner* — Daniel C Comings
(74) *Attorney, Agent, or Firm* — Posz Law Group, PLC

(57) ABSTRACT

The refrigerant device includes a refrigerant circuit, an injection circuit, an inlet temperature sensor, an outlet temperature sensor, and a controller configured to control the operation of the refrigerant circuit. The controller includes an evaluation value calculation unit and a refrigerant amount detection unit. The evaluation value calculation unit calculates an evaluation value indicating a capability of a subcooling heat exchanger in accordance with an inlet temperature detected by the inlet temperature sensor and an outlet temperature detected by the outlet temperature sensor. The refrigerant amount detection unit determines whether there is a shortage of refrigerant in accordance with the evaluation value calculated by the evaluation value calculation unit.

9 Claims, 7 Drawing Sheets

(52) U.S. Cl.
CPC ..... *F25B 2400/054* (2013.01); *F25B 2500/19* (2013.01); *F25B 2500/23* (2013.01); *F25B 2500/24* (2013.01); *F25B 2600/0253* (2013.01); *F25B 2600/111* (2013.01); *F25B 2600/2509* (2013.01); *F25B 2700/195* (2013.01); *F25B 2700/1931* (2013.01); *F25B 2700/1933* (2013.01); *F25B 2700/2103* (2013.01); *F25B 2700/2106* (2013.01); *F25B 2700/2108* (2013.01); *F25B 2700/21163* (2013.01)

(58) Field of Classification Search
CPC .......... F25B 2500/19; F25B 2700/1931; F25B 2700/1933; F25B 2700/2106; F25B 2700/2103; F25B 2700/2108; F25B 2700/21163; F24F 1/0003; F24F 1/00073
See application file for complete search history.

(56) References Cited

U.S. PATENT DOCUMENTS

| | | | | |
|---|---|---|---|---|
| 2011/0088421 | A1* | 4/2011 | Wakamoto | F25B 13/00 62/238.7 |
| 2015/0211772 | A1* | 7/2015 | Shimazu | F25B 49/02 62/196.4 |
| 2015/0298525 | A1* | 10/2015 | Miyakoshi | F25B 40/00 62/160 |
| 2015/0354838 | A1* | 12/2015 | Cur | B01D 46/0023 62/426 |

FOREIGN PATENT DOCUMENTS

| | | |
|---|---|---|
| JP | 2008-309474 A | 12/2008 |
| JP | 2010-223542 A | 10/2010 |
| JP | 2011-226704 A | 11/2011 |
| JP | 2012-132639 A | 7/2012 |
| WO | 2015/111222 A1 | 7/2015 |

OTHER PUBLICATIONS

International Search Report ("ISR") dated Jul. 19, 2016 issued in corresponding international patent application No. PCT/JP2016/063741.

\* cited by examiner

REFRIGERATION DEVICE HAVING CONDENSER UNIT CONNECTED TO COMPRESSOR UNIT WITH ON-SITE PIPE INTERPOSED THEREBETWEEN AND REMOTE FROM THE COMPRESSOR UNIT

CROSS REFERENCE TO RELATED APPLICATION

This application is a U.S. national stage application of PCT/JP2016/063741 filed on May 9, 2016, the contents of which are incorporated herein by reference.

TECHNICAL FIELD

The present invention relates to a refrigerating device that detects a shortage of refrigerant when a refrigerant having a temperature glide is used.

BACKGROUND ART

An excess or deficiency of refrigerant in a refrigerating device causes performance degradation or damage to the constituent equipment of the refrigerating device. Thus, detecting an excess or deficiency of refrigerant charged into a refrigerating device has been presented (e.g., refer to Patent Literature 1). Patent Literature 1 discloses a refrigerating and air-conditioning device that detects an excess or deficiency of refrigerant by calculating the temperature effectiveness of a subcooling heat exchanger to estimate the amount of refrigerant from the calculated temperature effectiveness. Here, discharge pressure is measured using a pressure sensor provided on the discharge side of a compressor, a saturated gas temperature is obtained in accordance with the discharge pressure, and the temperature effectiveness is calculated using the saturated gas temperature and an outdoor air temperature or the outlet temperature of a condenser. When the temperature effectiveness falls below a threshold, a controller detects a shortage of refrigerant.

CITATION LIST

Patent Literature

Patent Literature 1: Japanese Unexamined Patent Application Publication No. 2010-223542

SUMMARY OF INVENTION

Technical Problem

If refrigerant for use in a refrigerating device is a refrigerant having a temperature glide, such as R4070, R410A, DR55, or N40 (R448A), a temperature difference arises between a gas saturation temperature and a liquid saturation temperature. If the refrigerating device is a remote conditioning unit in which an indoor compressor and an outdoor condenser are provided as separate cabinets, a pipe is installed between the indoor compressor unit and the outdoor condenser unit on site. Thus, there are large pressure losses between the discharge side of the compressor and the outlet side of the condenser. In this case, when temperature effectiveness is calculated as described in Patent Literature 1, the temperature effectiveness exceeds an actual value, or when the degree of subcooling is calculated, the degree of subcooling exceeds an actual value. Thus, the calculation accuracy of the temperature effectiveness and the degree of subcooling decreases, thereby causing incorrect detection of the amount of refrigerant.

The present invention has been made to solve the above problems, and the objective of the present invention is to provide a refrigerating device capable of suppressing incorrect detection for a determination on whether there is an excess or deficiency of refrigerant.

Solution to Problem

A refrigerating device according to an embodiment of the present invention includes: a refrigerant circuit in which a compressor, a condenser, a subcooling heat exchanger, a decompressor, and an evaporator are connected with refrigerant pipes, the compressor compressing refrigerant, the condenser causing the refrigerant discharged from the compressor to reject heat and then cooling the refrigerant, the subcooling heat exchanger subcooling the refrigerant flowing out from the condenser, the decompressor decompressing the refrigerant subcooled by the subcooling heat exchanger, and the evaporator removing heat from the refrigerant decompressed and expanded by the decompressor and then evaporating the refrigerant; an injection circuit that causes a portion of refrigerant branching from a path between the subcooling heat exchanger and the decompressor and that has then flowed out from the subcooling heat exchanger to flow into the compressor; an inlet temperature sensor configured to detect an inlet temperature of the refrigerant flowing from the condenser into the subcooling heat exchanger; an outlet temperature sensor configured to detect an outlet temperature of the refrigerant flowing out from the subcooling heat exchanger toward the decompressor; and a controller configured to control operation of the refrigerant circuit, in which the compressor, the subcooling heat exchanger, the inlet temperature sensor, and the outlet temperature sensor are provided inside a compressor unit, the condenser is connected to the compressor and the subcooling heat exchanger with an on-site pipe interposed therebetween and is provided inside a condenser unit different from the compressor unit, and the controller includes: an evaluation value calculation unit that calculates an evaluation value indicating a capability of the subcooling heat exchanger in accordance with the inlet temperature detected by the inlet temperature sensor and the outlet temperature detected by the outlet temperature sensor; and a refrigerant amount detection unit that determines whether there is a shortage of refrigerant in accordance with the evaluation value calculated by the evaluation value calculation unit.

Advantageous Effects of Invention

A refrigerating device according to an embodiment of the present invention obtains temperature effectiveness in accordance with the inlet temperature of a subcooling heat exchanger. Accordingly, for example, even if a refrigerant having a temperature glide is used or even if a compressor and a condenser are separate units, a shortage of refrigerant can be detected at high accuracy without creating a complex control system.

DESCRIPTION OF EMBODIMENTS

Embodiment 1

Figure 1:
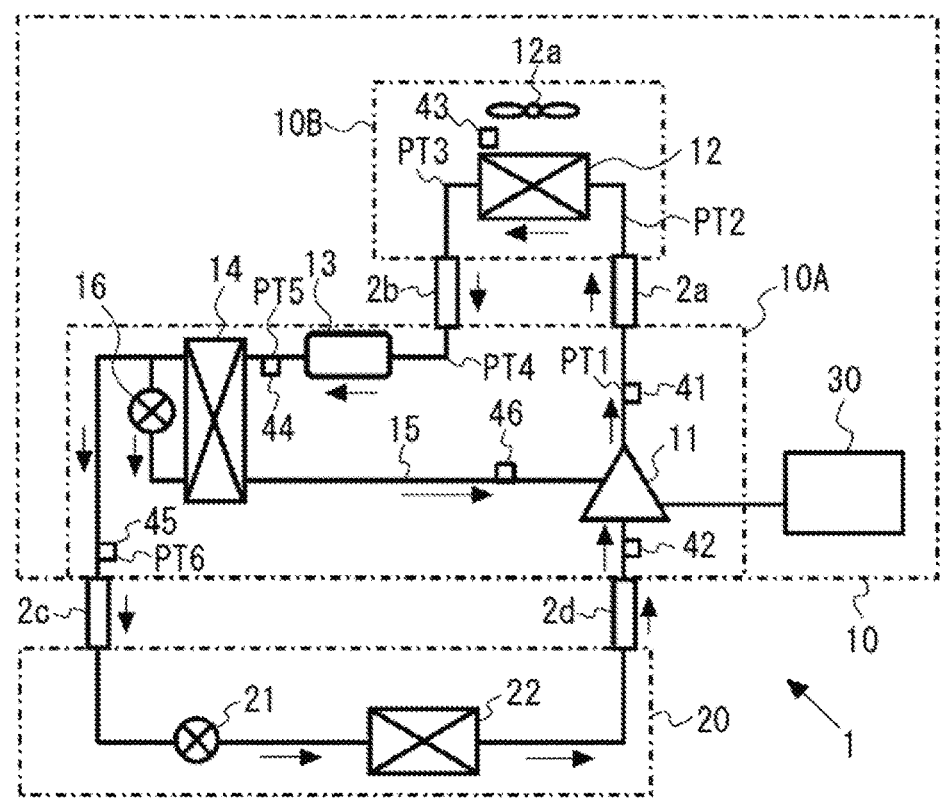
FIG. 1 is a refrigerant circuit diagram of a refrigerating device according to Embodiment 1 of the present invention.

Hereinafter, embodiments of refrigerating devices according to the present invention will be described with reference to the Drawings. FIG. 1 is a refrigerant circuit diagram of a refrigerating device according to Embodiment 1 of the present invention. A refrigerating device 1 shown in FIG. 1, for example, cools a warehouse and cools items sold in a store by performing vapor compression refrigerant cycle operation. The refrigerating device 1 includes a heat-source-side unit 10 and a load-side unit 20. The heat-source-side unit 10 includes a compressor unit 10A and a condenser unit 10B. The compressor unit 10A, the condenser unit 10B, and the load-side unit 20 are independent of one another. The compressor unit 10A and the condenser unit 10B are connected to each other with an on-site pipe 2a and an on-site pipe 2b interposed therebetween. The compressor unit 10A and the load-side unit 20 are connected to each other with a refrigerant pipe 2c and a refrigerant pipe 2d interposed therebetween.

The refrigerating device 1 in FIG. 1 includes a compressor 11, a condenser 12, a subcooling heat exchanger 14, a decompressor 21, and an evaporator 22. These devices are connected using the refrigerant pipes and constitute a refrigerant circuit through which refrigerant circulates. The compressor unit 10A accommodates the compressor 11 and the subcooling heat exchanger 14. The load-side unit 20 accommodates the decompressor 21 and the evaporator 22.

The compressor 11 compresses refrigerant and discharges the compressed refrigerant. The compressor 11 is a compressor having a variable operation capacity, or is a frequency-fixed, constant-speed compressor. For instance, for the compressor having a variable operation capacity, the compressor 11 is a positive-displacement compressor that is driven by a motor controlled by an inverter. The compressor 11 may also be a scroll compressor that has a scroll compression space in which an injection port is provided at an intermediate pressure part and that has an intermediate pressure sensor 46 for measuring intermediate pressure. It should be noted that although the number of the compressors 11 provided is one, this is an example, and two or more compressors 11 may be connected in parallel in accordance with a load of the load-side unit 20. For a specification in which the compressor 11 is driven by an inverter, a compressor inverter board for changing a driving frequency is installed in the heat-source-side unit 10.

The condenser 12 includes, for example, a fin-and-tube heat exchanger having a heat-transfer tube and multiple fins and is connected to the discharge side of the compressor 11 with the on-site pipe 2a interposed therebetween. The condenser unit 10B further includes a fan 12a for sending air to the condenser 12. A receiver 13 has the capability of temporarily retaining the refrigerant flowing out from the condenser 12 and the capability of separating liquid refrigerant and gas refrigerant from each other. The subcooling heat exchanger 14 is a refrigerant-to-refrigerant heat exchanger that subcools the refrigerant flowing out from the condenser 12 and is connected to the condenser 12 with the on-site pipe 2b and the receiver 13 interposed therebetween. The subcooling heat exchanger 14 is, for example, a double-tube heat exchanger or a plate heat exchanger and preforms heat exchange between refrigerant and refrigerant that each have flowed out from the condenser 12.

The decompressor 21 includes, for example, an electronic expansion valve or a temperature expansion valve. The decompressor 21 decompresses and expands the refrigerant subcooled by the subcooling heat exchanger 14 and regulates the flow rate of the refrigerant flowing through the refrigerant circuit. The evaporator 22 includes a heat exchanger that removes heat of the refrigerant decompressed and expanded by the decompressor 21 and then evaporates the refrigerant. The heat exchanger is, for example, a fin-and-tube heat exchanger that has a heat-transfer tube and multiple fins.

It should be noted that a fluid, the heat of which is to be exchanged with the heat of the refrigerant, is air in the refrigerating device 1. However, the fluid may be, for example, water, another refrigerant, or brine. The fluid may be a refrigerant having a temperature glide, such as DR55 or N40 (R448A), in particular. FIG. 1 shows a configuration example in which the number of the load-side units 20 provided is one. However, two or more load-side units 20 may be provided. In the latter case, the load-side units 20 may have different capacities or may have the same capacity. Although the decompressor 21 is provided in the load-side unit 20, it may be provided in the heat-source-side unit 10.

The refrigerating device 1 further includes an injection circuit 15 and a flow rate regulator 16. Refrigerant flows through a path deviating from a path between the decompressor 21 and the subcooling heat exchanger 14 including, for example, double tubes. Subsequently, heat exchange is performed on the refrigerant by the subcooling heat exchanger 14. The injection circuit 15 then causes the refrigerant to flow into the compressor 11. The flow rate regulator 16 regulates the flow rate of the refrigerant that will flow into the injection circuit 15. The flow rate regulator 16 includes, for example, an electronic expansion valve and regulates the flow rate of the refrigerant flowing through the path toward the subcooling heat exchanger 14 and the injection circuit 15 in accordance with the control by the controller 30.

Figure 2:
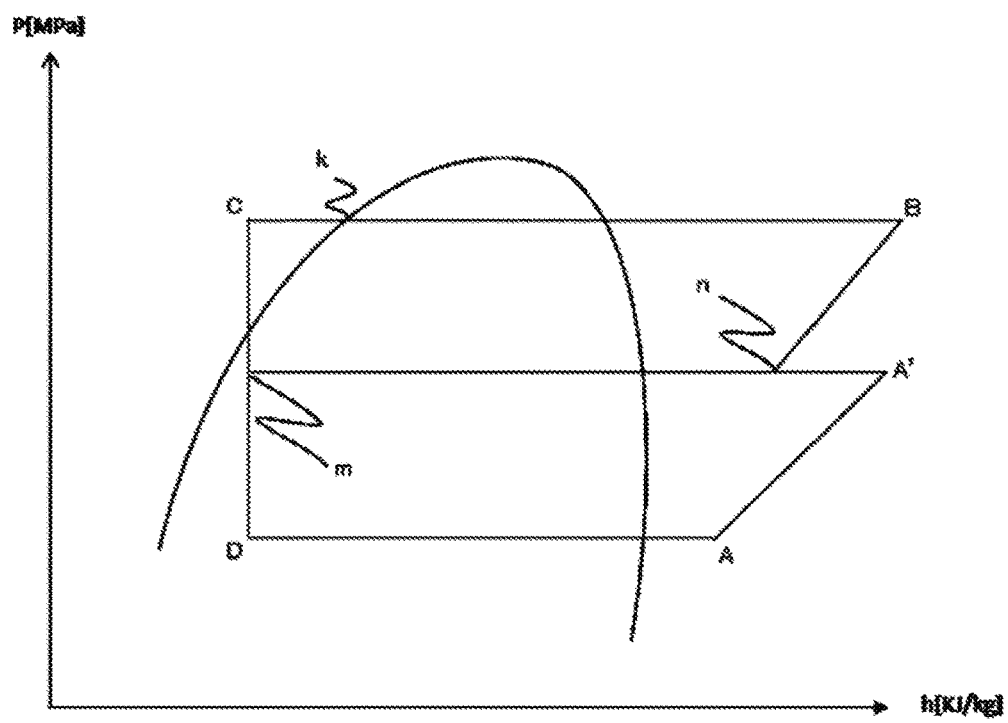
FIG. 2 is a p-h diagram for when the refrigerating device is charged with an adequate amount of refrigerant in Embodiment 1 of the present invention.

FIG. 2 is a p-h diagram for when the refrigerating device 1 is charged with an adequate amount of refrigerant in Embodiment 1 of the present invention. With reference to FIGS. 1 and 2, an example of operation of the refrigerating device 1 will be described. First, refrigerant compressed by the compressor 11 becomes high-temperature, high-pressure gas refrigerant (point A→point A'→n→point B in FIG. 2) and then flows into the condenser 12. The gas refrigerant that has flowed into the condenser 12 condenses into liquid refrigerant (point B→point k in FIG. 2), and the liquid refrigerant is temporarily retained inside the receiver 13. Excess liquid refrigerant in the refrigerant circuit that is produced in accordance with an operation load of the load-side unit 20, an outside air temperature, or a condensing temperature is accumulated in the receiver 13. Subsequently, the liquid refrigerant inside the receiver 13 flows into the subcooling heat exchanger 14, and heat exchange is performed on the liquid refrigerant by the subcooling heat exchanger 14 (point k→point C in FIG. 2). The subcooled refrigerant is decompressed by the decompressor 21 into low-pressure, two-phase gas-liquid refrigerant and is then sent to the evaporator 22 (point C→point D in FIG. 2). Heat is exchanged between the refrigerant sent to the evaporator 22 and, for example, the air. The refrigerant becomes gas refrigerant and flows into the compressor 11 (point D→point A in FIG. 2).

Meanwhile, a portion of the refrigerant flowing from the subcooling heat exchanger 14 toward the decompressor 21 flows toward the subcooling heat exchanger 14. The liquid refrigerant flowing toward the subcooling heat exchanger 14 is decompressed by the flow rate regulator 16 into intermediate-pressure, two-phase refrigerant, and heat exchange is performed on the refrigerant by the subcooling heat exchanger 14. The refrigerant then becomes intermediate-pressure refrigerant (point C→point m in FIG. 2). Subsequently, the intermediate-pressure refrigerant enters the injection port of the compressor 11 via the injection circuit 15 (point m→point n in FIG. 2), thereby decreasing the temperature of the high-pressure refrigerant on the discharge side of the compressor 11.

Operation of the refrigerating device 1 is controlled by the controller 30. The controller 30 controls operation of, for example, the compressor 11 in accordance with information detected by various sensors. Specifically, the refrigerating device 1 includes a discharge pressure sensor 41, a suction pressure sensor 42, an outdoor air temperature sensor 43, an inlet temperature sensor 44, and an outlet temperature sensor 45. The discharge pressure sensor 41 is provided on the discharge side of the compressor 11 and detects the discharge pressure of the refrigerant discharged from the compressor 11. The suction pressure sensor 42 is provided on the suction side of the compressor 11 and detects the pressure of the refrigerant to be sucked by the compressor 11. The outdoor air temperature sensor 43 detects the temperature of the outdoor air to be sent to the condenser 12. The inlet temperature sensor 44 detects the temperature of the refrigerant that will flow into the subcooling heat exchanger 14. The outlet temperature sensor 45 detects an outlet temperature Tout of the liquid refrigerant flowing out from the subcooling heat exchanger 14.

The refrigerating device 1 further includes the intermediate pressure sensor 46, which is provided in the injection circuit 15 (bypass pipe) between the flow rate regulator 16 and the compressor 11. The intermediate pressure sensor 46 detects the intermediate pressure of the refrigerant. It should be noted that the intermediate pressure need not be detected by the intermediate pressure sensor 46 provided. In the controller 30, the intermediate pressure may be calculated using a known expression in accordance with discharge pressure detected by the discharge pressure sensor 41 and suction pressure detected by the suction pressure sensor 42.

The controller 30 controls the constituent equipment during normal control operation in accordance with pieces of information sent from the various sensors. For instance, the controller 30 controls the operation frequency of the compressor 11 so that the evaporating temperature in a refrigerant cycle corresponds to a target value (e.g., zero degrees Celsius). That is, when the evaporating temperature exceeds the target value, the controller 30 controls the compressor 11 so that the operation frequency is increased, whereas when the evaporating temperature falls below the target value, the controller 30 controls the compressor 11 so that the operation frequency is decreased. The controller 30 also controls the rotation speed of the fan 12a so that the condensing temperature in the condenser 12 corresponds to a target value (e.g., 45 degrees Celsius). That is, when the condensing temperature exceeds the target value, the controller 30 increases the rotation speed of the fan 12a, whereas when the condensing temperature falls below the target value, the controller 30 decreases the rotation speed of the fan 12a. The controller 30 also regulates the opening degree of the flow rate regulator 16 in accordance with the discharge temperature of the refrigerant discharged from the compressor 11, which is derived from the discharge pressure. When the discharge temperature is high, the controller 30 performs control to increase the opening degree of the flow rate regulator 16, whereas when the discharge temperature is low, the controller 30 performs control to close the flow rate regulator 16.

Figure 3:
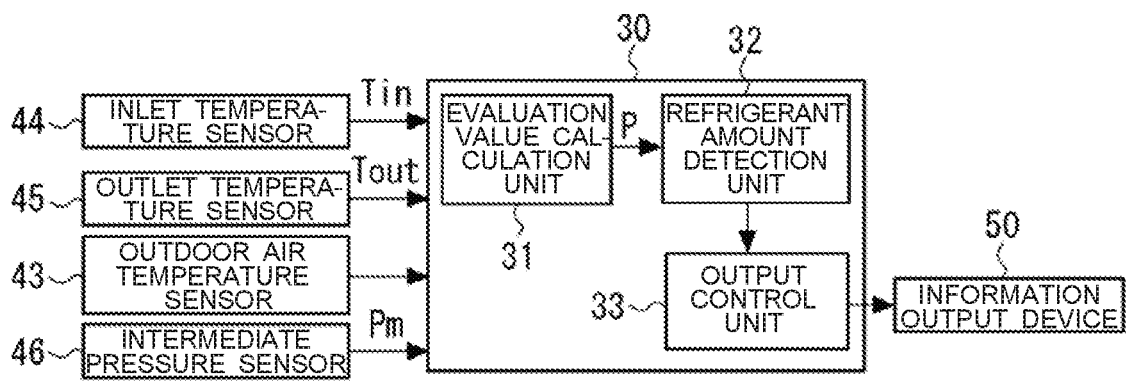
FIG. 3 is a functional block diagram showing an example of a controller in the refrigerating device in FIG. 1.

The controller 30 has, in particular, a function of determining whether there is a shortage of the refrigerant inside the refrigerant cycle in accordance with an inlet temperature Tin, the outlet temperature Tout, and intermediate pressure Pm. FIG. 3 is a functional block diagram showing an example of the controller in the refrigerating device in FIG. 1. The controller 30 in FIG. 3 includes hardware such as a circuit device for implementing the function or an arithmetic unit such as a microcomputer or a CPU, and software running thereon. The controller 30 includes an evaluation value calculation unit 31, a refrigerant amount detection unit 32, and an output control unit 33.

The evaluation value calculation unit 31 calculates the temperature effectiveness of the subcooling heat exchanger 14 as an evaluation value P in accordance with the inlet temperature Tin detected by the inlet temperature sensor 44 and the outlet temperature Tout detected by the outlet temperature sensor 45. The evaluation value calculation unit 31 calculates the evaluation value P using expression (1) below. It should be noted that in expression (1) below, the intermediate pressure saturation temperature is a saturation temperature derived from the intermediate pressure Pm detected by the intermediate pressure sensor 46.

[Expression 1]

$$\text{Evaluation value } P = (\text{inlet temperature } T\text{in} - \text{outlet temperature } T\text{out}) / (\text{inlet temperature } T\text{in} - \text{intermediate pressure saturation temperature}) \quad (1)$$

It should be noted that when the evaluation value calculation unit 31 calculates the evaluation value P, the value of each temperature used in expression (1) may be an instantaneous value. However, the evaluation value P should preferably be a moving average of temperature effectiveness that varies at different time points. By taking a moving average of each temperature, a determination on the amount of refrigerant can also be made in consideration of the stability of the refrigerant cycle.

Expression (1) shows an example in which the intermediate pressure saturation temperature is used. However, the evaluation value calculation unit 31 may calculate the evaluation value P using an outdoor air temperature detected by the outdoor air temperature sensor 43. In this case, the evaluation value calculation unit 31 calculates the evaluation value P using expression (2) below.

[Expression 2]

$$\text{Evaluation value } P = (\text{inlet temperature } T\text{in} - \text{outlet temperature } T\text{out}) / (\text{inlet temperature } T\text{in} - \text{outdoor air temperature}) \quad (2)$$

The refrigerant amount detection unit 32 determines whether there is a shortage of refrigerant using the evaluation value P calculated by the evaluation value calculation unit 31. A set threshold Pref is pre-stored in the refrigerant amount detection unit 32. When the evaluation value P falls below the set threshold Pref (P<Pref), the refrigerant amount detection unit 32 determines that there is a shortage of refrigerant. Here, the set threshold Pref is pre-stored. However, this is an example, and the set threshold Pref may be input from an input unit such as a remote control or switches on a board or may be obtained through communication with a remote area.

Figure 4:
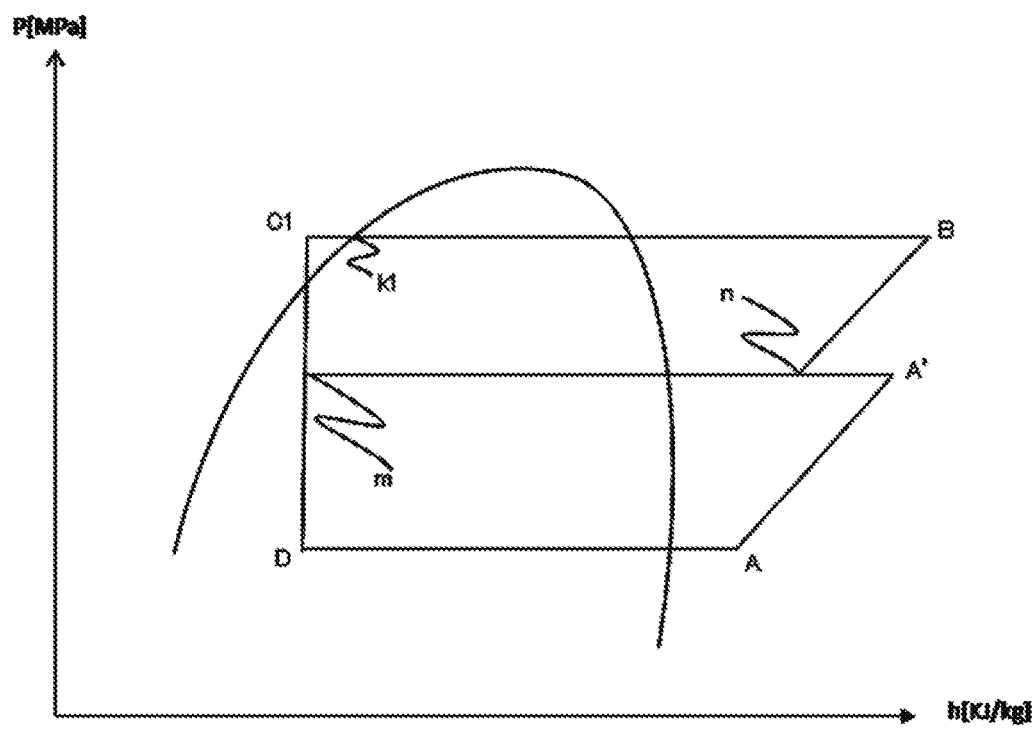
FIG. 4 is a p-h diagram for when there is a shortage of refrigerant in Embodiment 1 of the present invention.

FIG. 4 is a p-h diagram for when there is a shortage of refrigerant in Embodiment 1 of the present invention. When a shortage of refrigerant occurs in the refrigerant cycle in the refrigerating device 1, and if the receiver 13 retains excess liquid refrigerant, the amount of the excess liquid refrigerant decreases. While excess liquid refrigerant exists in the receiver 13, a refrigerant state in the other constituent equipment is the same state as that in FIG. 3. However, when more refrigerant leaks, the excess liquid refrigerant retained in the receiver 13 is lost. Then, a refrigerant state in the outlet of the condenser 12 becomes a two-phase gas-liquid state. Accordingly, enthalpy on the outlet side of the subcooling heat exchanger 14 increases, and the refrigerant state becomes the state of point C1 in FIG. 4. Thus, low enthalpy on the left side of the p-h diagram in FIG. 4 has a high value overall. As a result, the degree of subcooling decreases, and the temperature effectiveness decreases. A change in the temperature effectiveness due to operation conditions is smaller than that in the degree of subcooling due to the operation conditions. Thus, for the temperature effectiveness, even if the amount of refrigerant leaked is small, a shortage of refrigerant can be detected.

Figure 14:
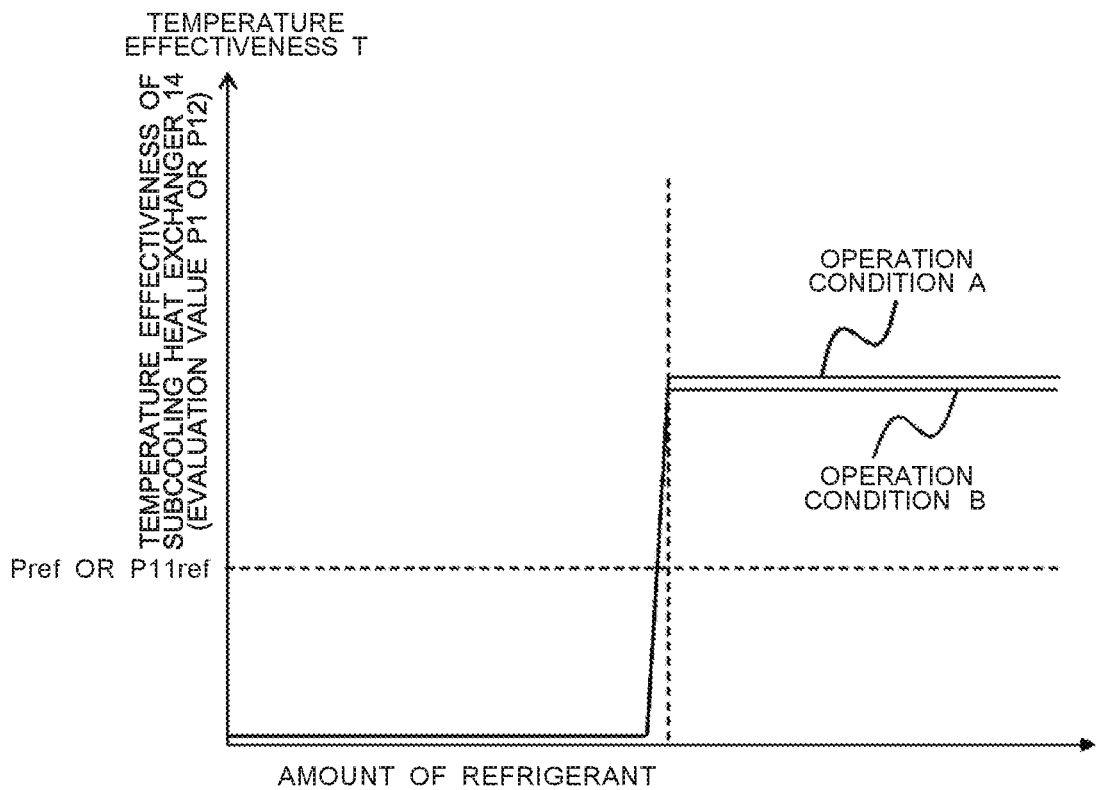
FIG. 14 shows relationships between the temperature effectiveness of a subcooling heat exchanger 14 of the refrigerating device in FIG. 1 and operation conditions of the refrigerating device.

FIG. 14 shows relationships between the temperature effectiveness of the subcooling heat exchanger 14 in the refrigerating device shown in FIG. 1 and operation conditions of the refrigerating device. In FIG. 14, the horizontal axis indicates the amount of refrigerant, whereas the vertical axis indicates the temperature effectiveness T of the subcooling heat exchanger 14. As shown in FIG. 14, first, the amount of refrigerant decreases. Then, the amount of refrigerant reaches E (the amount of refrigerant decreases to a certain amount). Finally, the receiver 13 becomes empty of the excess liquid refrigerant. As a result, the temperature effectiveness T of the subcooling heat exchanger 14 decreases. Thus, when the temperature effectiveness T falls below a preset temperature effectiveness threshold T1, it is determined that the refrigerant has leaked. The temperature effectiveness T indicates a capability of the subcooling heat exchanger 14. A change in the temperature effectiveness T due to the operation conditions of the refrigerating device 1 is smaller than that in the degree of subcooling due to the operation conditions of the refrigerating device 1. Thus, for the temperature effectiveness T, a threshold in the refrigerating device 1 is more easily set.

When the refrigerant amount detection unit 32 determines that there is a shortage of refrigerant, the output control unit 33 in FIG. 3 outputs the result to an information output device 50 or other device. It should be noted that a method of outputting is not limited to displaying or outputting of information by the information output device 50 such as a liquid crystal display or a display of LEDs placed on the board of the controller 30. For instance, the output control unit 33 may output communication data to a remote area or may inform a repair engineer of abnormality occurrence by directly outputting the data through, for example, a telephone line.

Figure 5:
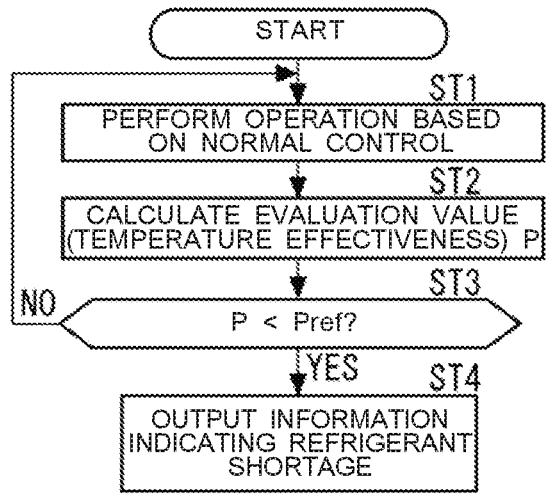
FIG. 5 is a flowchart showing an example of the operation of the controller in FIG. 3.

FIG. 5 is a flowchart showing an example of the operation of the refrigerating device in FIG. 1. With reference to FIGS. 1 to 5, the example of the operation of the refrigerating device 1 will be described. It should be noted that detecting of the amount of refrigerant described below may be applied, for example, for initial refrigerant charging operation performed when the device is installed or for refrigerant recharging operation after refrigerant has been discharged once for maintenance. The operation of detecting the amount of refrigerant may be performed by transmitting an operation signal from external equipment to the controller 30 through wired or wireless communication.

First, normal control operation of the refrigerating device 1 is performed. The controller 30 performs automatic control during the normal operation in accordance with signals detected by the various sensors (step ST1). For instance, the controller 30 assesses operation data about, for example, the pressure and temperature of each component in the refrigerant cycle and calculates control values such as deviations from the target values of, for example, a condensing temperature and an evaporating temperature to control the fan 12a, the flow rate regulator 16, and the decompressor 21.

During the normal operation, the evaluation value calculation unit 31 calculates the evaluation value P in accordance with expression (1) above (step ST2). Subsequently, the refrigerant amount detection unit 32 determines whether the evaluation value P falls below the set threshold Pref (step ST3). If the evaluation value P is the set threshold Pref or greater (No in step ST3), the refrigerant amount detection unit 32 determines that a shortage of refrigerant has not occurred. Thus, the normal operation continues (step ST1). Meanwhile, if the evaluation value P is less than the set threshold Pref (Yes in step ST3), the refrigerant amount detection unit 32 determines that there is a shortage of refrigerant. Then, information indicating a shortage of refrigerant is output from the information output device 50 (step ST4).

In Embodiment 1, for example, even if a refrigerant having a temperature glide is used or even if a remote conditioning unit is used in which the compressor 11 and the condenser 12 are provided as separate units, a shortage of refrigerant can be detected with high accuracy without changing control, by calculating the evaluation value P in accordance with the inlet temperature Tin of the subcooling heat exchanger 14. That is, in FIG. 1, the evaluation value P exceeds an actual value due to, for example, pressure losses caused when the refrigerant passes through the on-site pipe 2a and the on-site pipe 2b. When the refrigerant is a refrigerant having a temperature glide such as DR55 or N40, the evaluation value P also exceeds the actual value. Accordingly, the calculation accuracy of the evaluation value P decreases, thereby causing incorrect detection of the amount of refrigerant.

Figure 6:
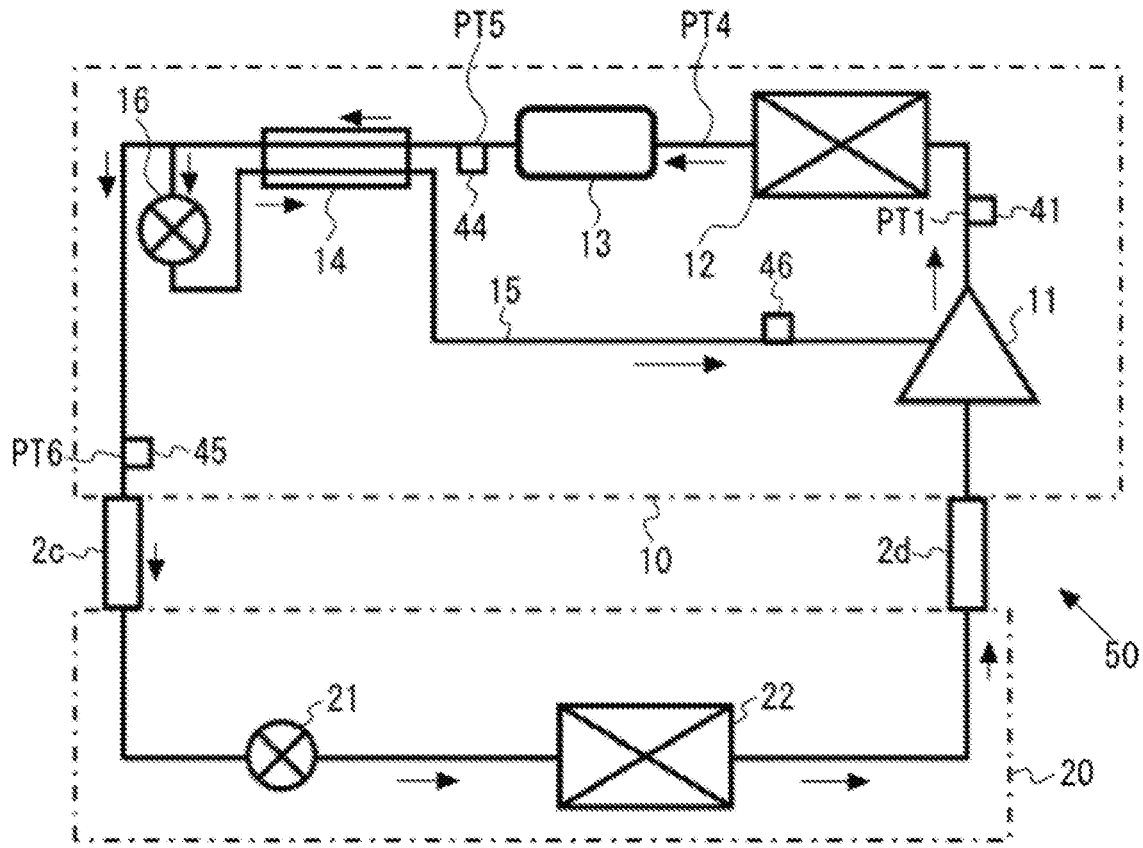
FIG. 6 is a refrigerant circuit diagram showing an example of a conventional all-in-one model refrigerating device.

FIG. 6 is a refrigerant circuit diagram showing an example of a conventional all-in-one model refrigerating device. In the conventional refrigerating device in FIG. 6, the evaluation value P indicating temperature effectiveness is calculated using expression (3) below. It should be noted that in expression (3), the saturated gas temperature derived from a pressure value is a value derived from discharge pressure detected by the discharge pressure sensor 41. That is, the temperature effectiveness is obtained by dividing the degree of subcooling by the largest temperature difference between a temperature measured on the high-temperature side of the subcooling heat exchanger 14 and a temperature measured on the low-temperature side of the subcooling heat exchanger 14.

[Expression 3]

Evaluation value $P$=(saturated gas temperature derived from pressure value−outlet temperature $T$out)/(saturated gas temperature derived from pressure value−intermediate pressure saturation temperature) (3)

For a remote model, under conditions: the saturated gas temperature=48 degrees Celsius (position PT1 in FIG. 1), the outlet temperature Tout=33 degrees Celsius (position PT6 in FIG. 1), and the intermediate pressure saturation temperature=25 degrees Celsius, the evaluation value P calculated from expression (3) equals 0.65. However, the true evaluation value P should be calculated using a saturation temperature of 42 degrees Celsius in position PT6 in FIG. 1 (refer to FIGS. 9 and 10 described later), and the true evaluation value P equals 0.53. Thus, for the remote model, there is a large difference between an actually calculated value of the evaluation value P and a true value of the evaluation value P.

Figure 7:
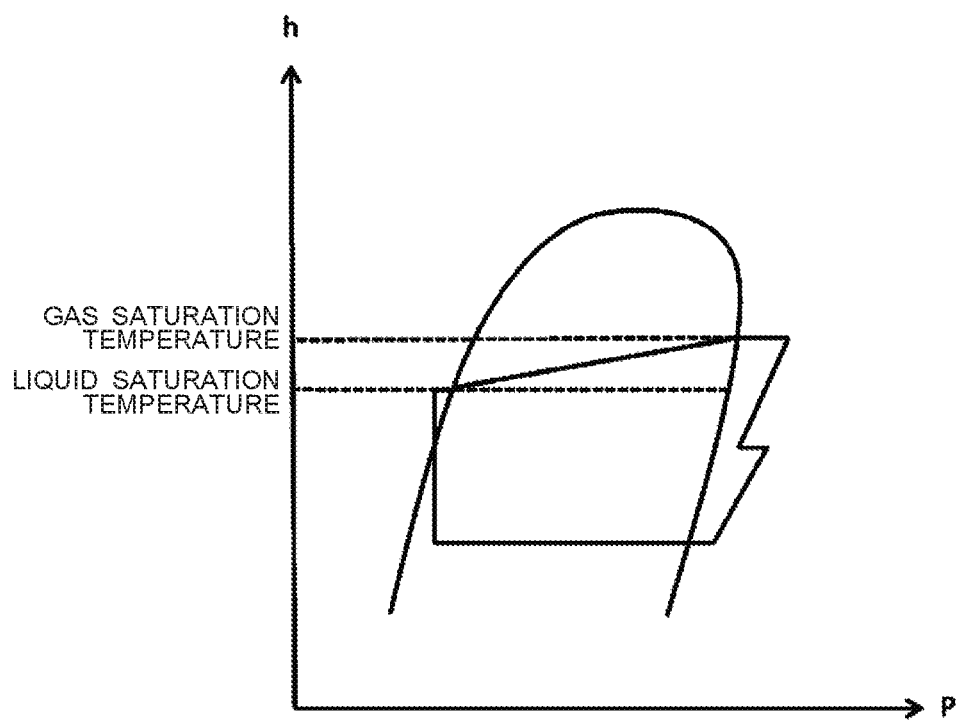
FIG. 7 is a p-h diagram for when a refrigerant having a temperature glide is used in the refrigerating device in FIG. 1.
Figure 8:
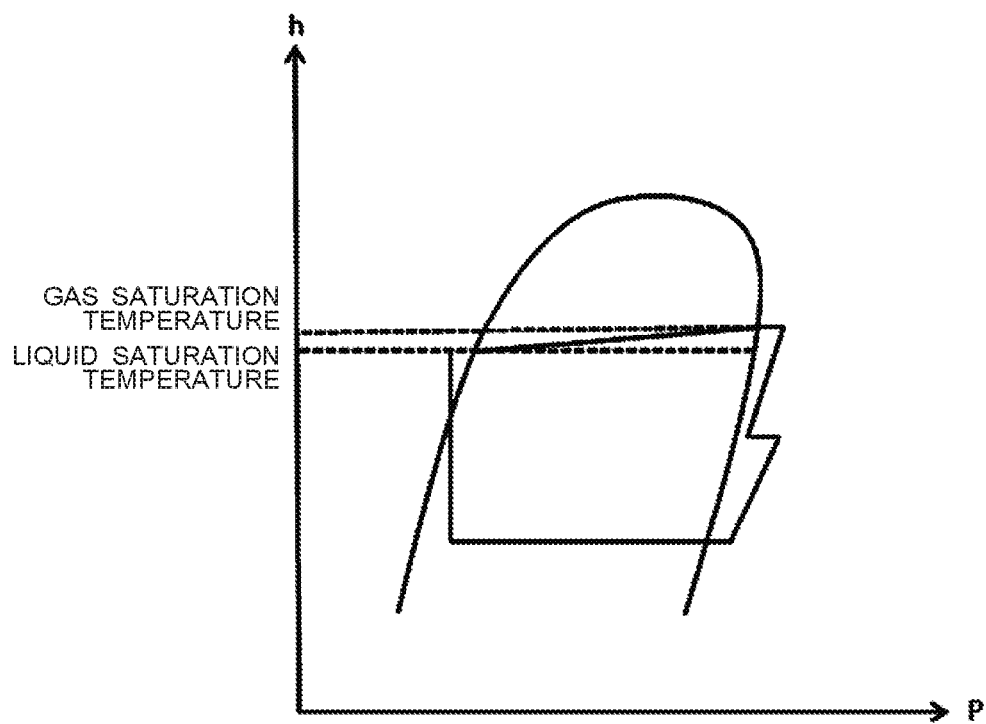
FIG. 8 is a p-h diagram for when a refrigerant having a temperature glide is used in the conventional refrigerating device in FIG. 6.

In particular, if a refrigerant having a temperature glide (such as DR55, R407C, R410A, N40 (R448A)) is used, a temperature difference arises between a gas saturation temperature and a liquid saturation temperature. FIG. 7 is a p-h diagram for when a refrigerant having a temperature glide is used in the refrigerating device in FIG. 1. FIG. 8 is a p-h diagram for when a refrigerant having a temperature glide is used in the conventional refrigerating device in FIG. 6. As known form FIGS. 7 and 8, when a refrigerant having a temperature glide is used, a difference between a gas saturation temperature and a liquid saturation temperature is larger in the remote model shown in FIG. 1 than in the all-in-one model shown in FIG. 6. Thus, for the remote model, when expression (3) is used, there is a large difference between an actually calculated value of the evaluation value P and a true value of the evaluation value P. Accordingly, the liquid saturation temperature should be used instead of the gas saturation temperature. This makes the control complicated.

Figure 9:
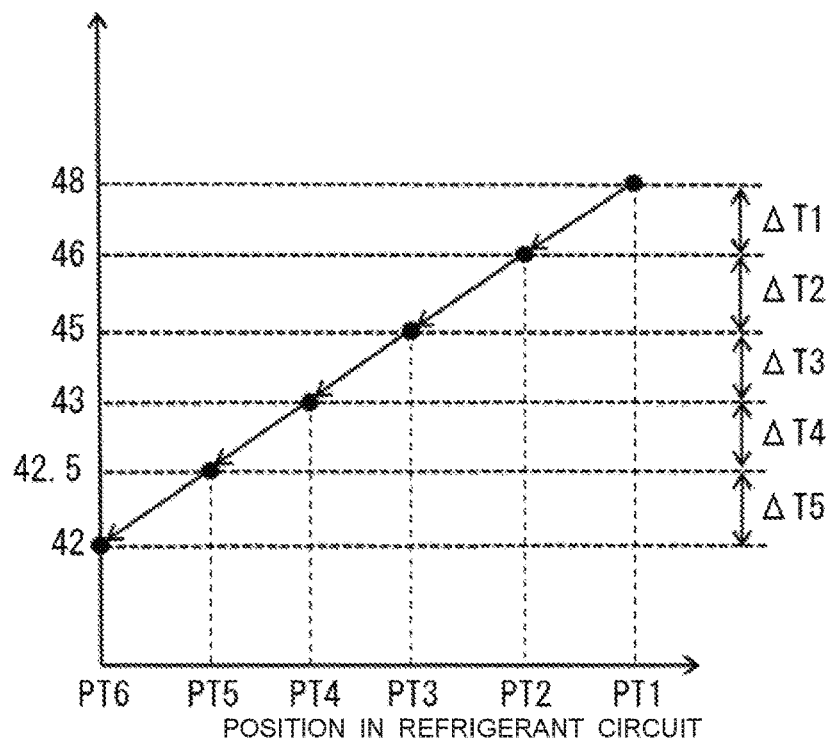
FIG. 9 is a graph showing saturation temperatures in positions in the refrigerating device shown in FIG. 1.
Figure 10:
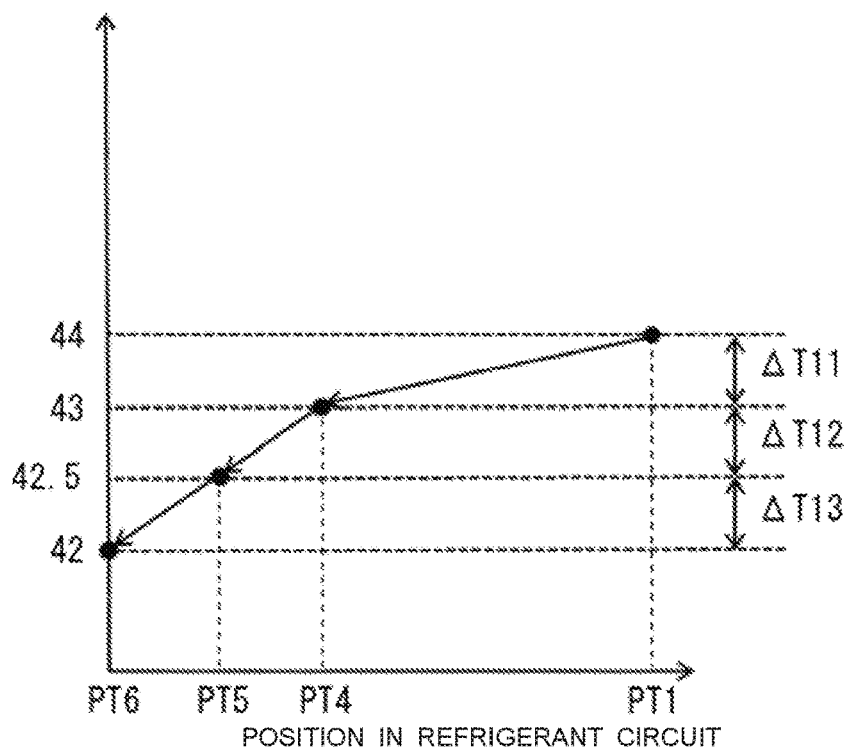
FIG. 10 is a graph showing saturation temperatures in positions in the conventional refrigerating device shown in FIG. 6.

Additionally, for the remote model, the on-site pipe 2a and the on-site pipe 2b are connected between the compressor 11 and the condenser 12 on site. Thus, pressure losses between the outlet of the compressor 11 and the outlet of the subcooling heat exchanger 14 are greater in the remote model than in the all-in-one model. FIG. 9 is a graph showing saturation temperatures in the positions in the refrigerating device shown in FIG. 1. FIG. 10 is a graph showing saturation temperatures in the positions in the conventional refrigerating device shown in FIG. 6. In FIG. 9, a temperature difference ΔT1 between the temperature in position PT1 on the discharge side of the compressor 11 and the temperature in position PT2 on the inlet side of the condenser 12 is a temperature difference caused by pressure losses in the on-site pipe 2a. A temperature difference ΔT2 between the temperature in position PT2 on the inlet side of the condenser 12 and the temperature in position PT3 on the outlet side of the condenser 12 is a temperature difference caused by the temperature glide of the refrigerant described above. A temperature difference ΔT3 between the temperature in position PT3 on the outlet side of the condenser 12 and the temperature in position PT4 on the inlet side of the receiver 13 is a temperature difference caused by pressure losses in the on-site pipe 2b. A temperature difference ΔT4 and a temperature difference ΔT5, between the temperature in position PT4 on the inlet side of the receiver 13 and the temperature in position PT6 on the outlet side of the subcooling heat exchanger 14, are temperature differences caused by pressure losses in the refrigerant circuit. Meanwhile, in FIG. 10, a temperature difference is not caused by pressure losses in the on-site pipe 2a and the on-site pipe 2b. A temperature difference ΔT11, a temperature difference ΔT12, and a temperature difference ΔT13 are caused by pressure losses in the refrigerant circuit.

Thus, the remote model shown in FIG. 1 has greater pressure losses than the all-in-one model shown in FIG. 6. It is difficult to accurately correct pressure losses in on-site pipes that depend on on-site piping construction. Thus, a temperature effectiveness value cannot be accurately calculated, thereby increasing the possibility of incorrect detection or the possibility of detection failure.

Accordingly, the inlet temperature sensor 44 is provided on the inlet side of the subcooling heat exchanger 14 as shown in FIG. 1, and the evaluation value P is calculated in accordance with the inlet temperature Tin detected by the inlet temperature sensor 44 as shown in expression (1) above. By so doing, an actual value of the evaluation value P of the subcooling heat exchanger 14 can be calculated at high accuracy, and the amount of refrigerant can be more accurately determined. Specifically, under conditions: the inlet temperature Tin in position PT1 in FIG. 1=42.5 degrees Celsius, the outlet temperature Tout=33 degrees Celsius, and the intermediate pressure saturation temperature=25 degrees Celsius, the temperature effectiveness, which is the evaluation value $P,$=(42.5−33)÷(42.5−25)=0.54. This is substantially the same as a true value of 0.53. Thus, the actual value of the evaluation value P of the subcooling heat exchanger 14 can be calculated at high accuracy, and the amount of refrigerant can be more accurately determined.

Embodiment 2

Figure 11:
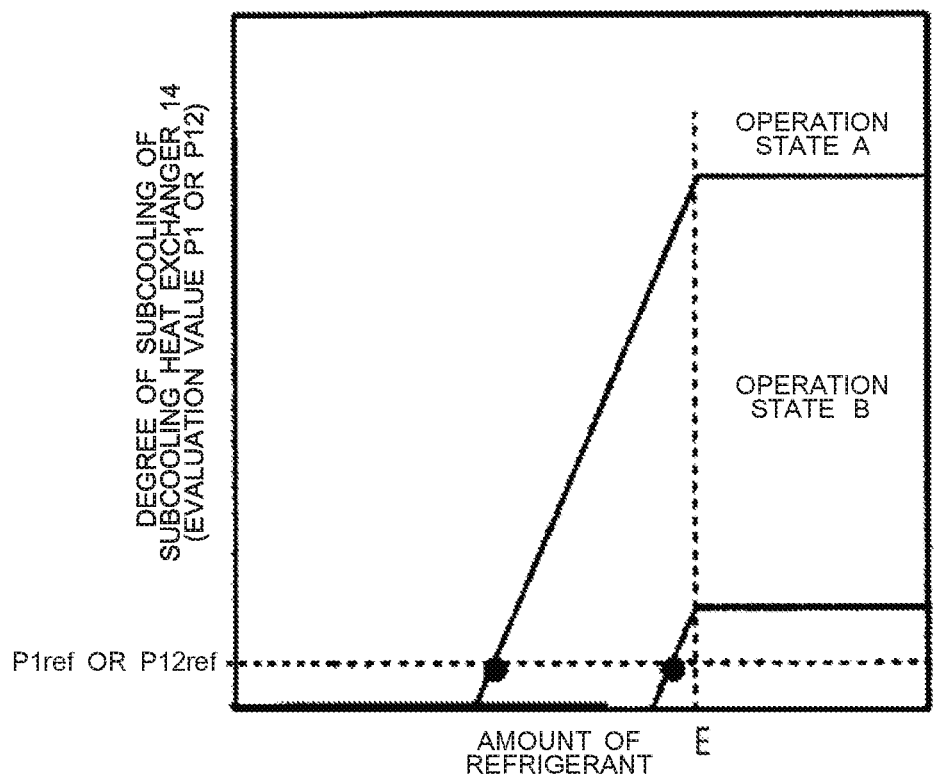
FIG. 11 is a graph showing examples of evaluation values in the controller of a refrigerating device according to Embodiment 2 of the present invention.

FIG. 11 is a graph showing examples of evaluation values in the controller of a refrigerating device according to Embodiment 2 of the present invention. Detecting of the amount of refrigerant will be described with reference to FIG. 11. It should be noted that the identical reference signs are assigned to parts that have the same configurations of those of the controller shown in FIG. 3, and explanations for the parts are omitted. As shown in FIG. 11, an evaluation value calculation unit 31 calculates the degree of subcooling (amount of subcooling) as an evaluation value P1 from expression (4) below in accordance with an inlet temperature Tin and an outlet temperature Tout.

[Expression 4]

$$\text{Evaluation value } P1(\text{degree of subcooling}) = \text{inlet temperature } Tin - \text{outlet temperature } Tout \quad (4)$$

When the degree of subcooling calculated as the evaluation value P1 falls below a set threshold P1ref, a refrigerant amount detection unit 32 determines that there is a shortage of refrigerant.

As shown in FIG. 11, when the amount of refrigerant decreases, and at the time (point E) when excess liquid refrigerant in a receiver 13 was lost, the degree of subcooling of a subcooling heat exchanger 14 starts decreasing. When the receiver 13 becomes empty of the excess liquid refrigerant, a refrigerant state in a condenser 12 and a refrigerant state in the subcooling heat exchanger 14 will change. Thus, the evaluation value calculation unit 31 in FIG. 3 calculates the degree of subcooling, which is a difference between a condensing temperature (inlet temperature Tin) and the outlet temperature Tout of the subcooling heat exchanger 14, as the evaluation value P1. When the evaluation value P1 falls below the set threshold Pref, the refrigerant amount detection unit 32 determines that there is a shortage of refrigerant.

As shown in FIG. 11, the degree of subcooling of the subcooling heat exchanger 14 considerably changes in accordance with the operation conditions of the refrigerating device 1 (such as outdoor air temperature, amount of heat exchange, and amount of circulating refrigerant). When detecting a shortage of refrigerant using the degree of subcooling, it is necessary to set a subcooling degree threshold S to a low value in order to avoid incorrect detection. Thus, for a high degree of subcooling, it takes a long time to detect a shortage of refrigerant. For instance, if refrigerant is leaking, the amount of the refrigerant leaked increases.

Even for Embodiment 2, in the same manner as Embodiment 1, a shortage of refrigerant can be detected at high accuracy without creating a complex control system, by calculating the evaluation value P1 in accordance with the inlet temperature Tin of the subcooling heat exchanger 14, for instance, even if a refrigerant having a temperature glide is used or even if a remote conditioning unit is used in which a compressor 11 and a condenser 12 are provided as separate units.

That is, for the all-in-one model in FIG. 6, as shown in expression (5) below, the degree of subcooling is calculated from a discharge pressure value detected by a discharge pressure sensor 41 and the outlet temperature Tout of liquid refrigerant detected by an outlet temperature sensor 45.

[Expression 5]

$$\text{Degree of subcooling} = \text{saturated gas temperature derived from discharge pressure value} - \text{outlet temperature } Tout \quad (5)$$

However, for a remote model as shown in FIG. 1, if the evaluation value calculation unit 31 calculates the degree of subcooling using expression (5) above, a difference between a true value and a value measured by a sensor is large as in the case of the temperature effectiveness described above. For instance, when the degree of subcooling is high during normal operation, unless the refrigerant decreases by a large amount, a shortage of refrigerant cannot be detected. Meanwhile, when the degree of subcooling is low, a tolerance up to the set threshold P1ref is small. Thus, even small variations lead to incorrect detection or detection failure. Even for the all-in-one model, if subcooling equipment is small and the temperature effectiveness is low, or if the subcooling equipment is large but an injection flow rate is low, thus leading to low temperature effectiveness, the degree of subcooling may be determined using expression (5) above. Also in this case, the temperature effectiveness is calculated from three parameters as in the case of the remote model. Thus, a difference from an actual value of the temperature effectiveness is large due to, for example, variations in index values for a shortage of refrigerant or hunting.

For instance, for the remote model, under the conditions: the saturated gas temperature derived from the discharge pressure value=48 degrees Celsius (position PT1 in FIG. 1), and the outlet temperature Tout=33 degrees Celsius (position PT5 in FIG. 1), the evaluation value P1=(48−33)=15. Meanwhile, the true value is calculated using a saturation temperature of 42 degrees Celsius in position PT5 in FIG. 1. Here, the evaluation value P1=(42−33)=9.0. Thus, for the remote model, there is a large difference between the true value and the actual value of the degree of subcooling.

Accordingly, the evaluation value calculation unit 31 calculates the evaluation value P1 indicating the degree of subcooling using an inlet temperature sensor 44 provided on the inlet side of the subcooling heat exchanger 14. In this case, when the inlet temperature Tin of the subcooling heat exchanger in position PT4 in FIG. 1=42.5 degrees Celsius, and when the outlet temperature Tout in position PT5=33 degrees Celsius (refer to FIG. 9), the degree of subcooling= (42.5−33)=9.5. This value is approximately the same as a true value of 9.0. Furthermore, the degree of subcooling is calculated using the two parameters as described above. Thus, it is possible to decrease variations in index values for a shortage of refrigerant and the possibility of incorrect detection or the possibility of detection failure.

Embodiment 3

Figure 12:
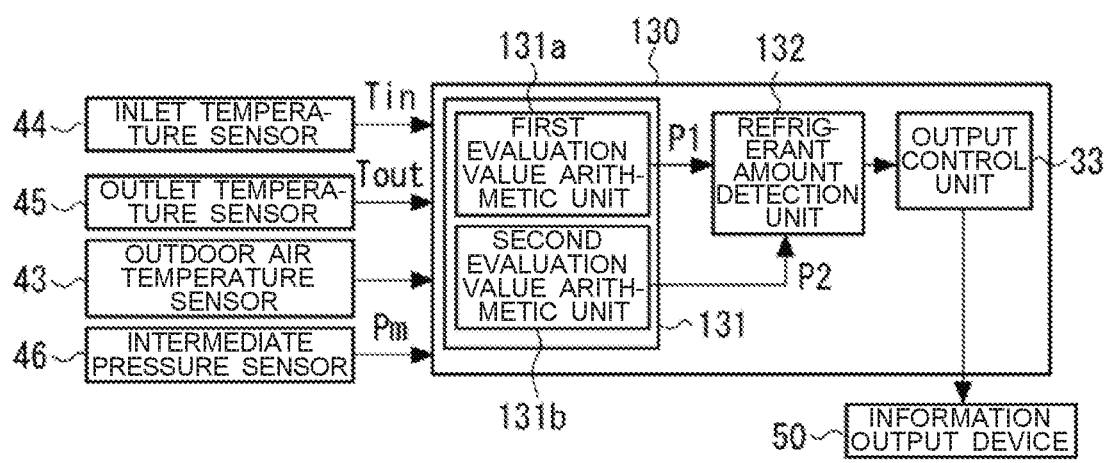
FIG. 12 is a functional block diagram showing an example of the controller of a refrigerating device according to Embodiment 3 of the present invention.

FIG. 12 is a functional block diagram showing an example of the controller of a refrigerating device according to Embodiment 3 of the present invention. A controller 130 will be described with reference to FIG. 12. It should be noted that the identical reference signs are assigned to parts that have the same configurations of those of the controller in FIG. 3, and explanations for the parts are omitted. The controller 130 in FIG. 12 detects a shortage of refrigerant using either a first evaluation value P11 or a second evaluation value P12. The controller 130 differs from the controller 30 in FIG. 3 in this respect.

In the controller 130 shown in FIG. 12, an evaluation value calculation unit 131 includes a first evaluation value arithmetic unit 131a that calculates the first evaluation value P11 and a second evaluation value arithmetic unit 131b that calculates the second evaluation value P12, which is different from the first evaluation value P11. The first evaluation value arithmetic unit 131a calculates the first evaluation value P11 from expression (1) or expression (2) above, expressions for calculating temperature effectiveness, as in the case of the evaluation value calculation unit 31 in FIG. 3. The second evaluation value arithmetic unit 131b calculates the second evaluation value P12 from expression (4) above, an expression for calculating the degree of subcooling.

A refrigerant amount detection unit 132 selects either the first evaluation value P11 or the second evaluation value P12 calculated by the evaluation value calculation unit 131, and detects a shortage of refrigerant using the first evaluation value P11 or the second evaluation value P12 selected. For instance, when pressure difference ΔPr between saturation pressure derived from an inlet temperature Tin (position PT5 in FIG. 1) and intermediate pressure detected by an intermediate pressure sensor 46 falls below an intermediate pressure threshold ΔPrref, the refrigerant amount detection unit 132 determines whether there is a shortage of refrigerant using the second evaluation value P12 (degree of subcooling). Meanwhile, when the pressure difference ΔPr between the saturation pressure and the intermediate pressure is the intermediate pressure threshold ΔPrref or greater, the refrigerant amount detection unit 132 determines whether there is a shortage of refrigerant using the first evaluation value P11 (temperature effectiveness).

The refrigerant amount detection unit 132 stores a first evaluation threshold P11ref, compared with which a determination using the first evaluation value P11 is made, and a second evaluation threshold P12ref, compared with which a determination using the second evaluation value P12 is made. When the first evaluation value P11 falls below the first evaluation threshold P11ref, the refrigerant amount detection unit 132 determines that there is a shortage of refrigerant. In the same manner, when the second evaluation value P12 falls below the second evaluation threshold P12ref, the refrigerant amount detection unit 132 determines that there is a shortage of refrigerant.

It should be noted that a ratio (compression ratio) of the saturation pressure of a temperature detected by the inlet temperature sensor 44 in FIG. 1 and the absolute pressure of the suction pressure sensor 42 may be set to a determination value. When the determination value falls below a set threshold, the refrigerant amount detection unit 132 can determine whether there is a shortage of refrigerant using the second evaluation value P12. Meanwhile, when the compression ratio is the set threshold or greater, the refrigerant amount detection unit 132 determines whether there is a shortage of refrigerant using the first evaluation value P11. When the inlet temperature Tin or the saturation temperature of the discharge pressure sensor that can be considered as almost the condensing temperature exceeds the set threshold, the refrigerant amount detection unit 132 may determine whether there is a shortage of refrigerant using the first evaluation value P11. Meanwhile, when the inlet temperature Tin or the saturation temperature falls below the set threshold, the refrigerant amount detection unit 132 may determine whether there is a shortage of refrigerant using the second evaluation value P12.

Figure 13:
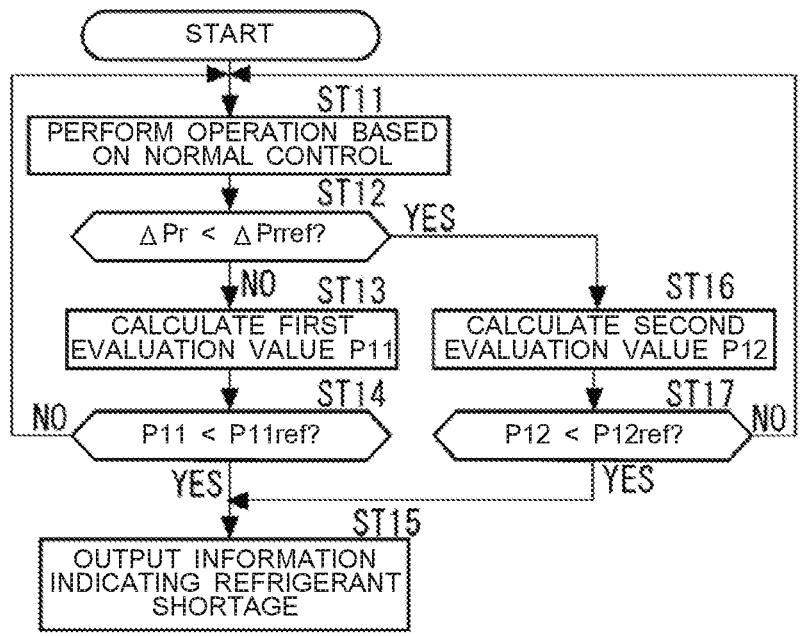
FIG. 13 is a flowchart showing an example of the operation of the controller in FIG. 12.

FIG. 13 is a flowchart showing an example of the operation of the controller in FIG. 12. Detecting of a refrigerant shortage by the controller 130 will be described with reference to FIGS. 12 and 13. First, normal control operation of the refrigerating device 1 in FIG. 1 is performed, and the controller 130 performs automatic control during the normal operation in accordance with signals detected by the various sensors (step ST11). Subsequently, the refrigerant amount detection unit 132 makes a determination on selecting the first evaluation value P11 or the second evaluation value P12 (step ST12). For instance, when the pressure difference ΔPr is the intermediate pressure threshold ΔPrref or greater (No in step ST12), the evaluation value calculation unit 131 calculates the first evaluation value P11 in accordance with expression (1) or expression (2) above (step ST13). Then, whether the first evaluation value P11 falls below the first evaluation threshold P11ref is determined (step ST14). When the first evaluation value P11 falls below the first evaluation threshold P11ref (Yes in step ST14), it is determined that there is a shortage of refrigerant. Then, information indicating a shortage of refrigerant is output from the information output device 50 (step ST15).

Meanwhile, when the pressure difference ΔPr falls below the intermediate pressure threshold ΔPrref (Yes in step ST12), the second evaluation value P12 is calculated (step ST16). Then, whether the second evaluation value P12 falls below the second evaluation threshold P12ref is determined (step ST17). When the second evaluation value P12 falls below the set threshold P2ref (Yes in step ST17), it is determined that there is a shortage of refrigerant. Then, information indicating a shortage of refrigerant is output from the information output device 50 (step ST15).

It should be noted that in FIG. 13, the first evaluation value P11 or the second evaluation value P12 is calculated after the determination on selecting either the first evaluation value P11 or the second evaluation value P12 has been made. However, this is an example, and the first evaluation value P11 or the second evaluation value P12 may be selected after the first evaluation value P11 or the second evaluation value P12 has been calculated. Here, an evaluation value is selected in accordance with the pressure difference ΔPr and the intermediate pressure threshold ΔPrref. However, an evaluation value may be selected in accordance with a compression ratio as described above.

In general, when the pressure difference ΔPr is high, when a ratio of the saturation pressure of the temperature in PT5 and the absolute pressure of the suction pressure sensor 42 is high, or when the condensing temperature is high, the degree of subcooling and the temperature effectiveness are high. Here, for a determination using the first evaluation value P11 (temperature effectiveness), even if a small amount of refrigerant has leaked, a shortage of refrigerant can be detected. However, for a determination using the second evaluation value P12 (degree of subcooling), unless a large amount of refrigerant leaks, a shortage of refrigerant cannot be detected. Accordingly, a determination is made using the first evaluation value P11 (temperature effectiveness).

When the pressure difference ΔPr is low, when the ratio of the saturation pressure of the temperature in PT5 and the absolute pressure of the suction pressure sensor 42 is low, or when the condensing temperature is low, the degree of subcooling and the temperature effectiveness are low even if the refrigerating device is charged with an adequate amount of refrigerant. Here, for a determination using the first evaluation value P11 (temperature effectiveness), many parameters are used. Thus, detection errors of the sensors, a change in degree of subcooling due to, for example, pressure losses, and a change in temperature effectiveness are likely to happen, thereby increasing the possibility of incorrect detection. Accordingly, a determination is made using the second evaluation value P12 (degree of subcooling) as fewer parameters are used.

For Embodiment 3, a shortage of refrigerant is detected using the first evaluation value P11 or the second evaluation value P12. By so doing, whether there is a shortage of refrigerant can be determined using the evaluation value matching the circuit configuration or the state of the refrigerant circuit. Accordingly, a determination can be made at high accuracy.

Embodiments of the present invention are not limited to the above embodiments, but various changes can be made. For instance, in the operation control above, control to specify the condensing temperature or the evaporating temperature is not performed. However, control may be performed so that the condensing temperature and the evaporating temperature are constant, for example. In the case of setting the operation frequency of the compressor 11 and the rotation speed of the fan 12a of the heat-source-side unit 10 to constant values, respectively, control is not performed on the condensing temperature and the evaporating temperature. Control may be performed so that either the condensing temperature or the evaporating temperature corresponds to a target value.

Thus, by performing control so that the operation states of the refrigerating device meet with fixed conditions, a change in the amount of operation states that changes in accordance with the degree of subcooling of the subcooling heat exchanger 14 decreases, the set threshold Pref and the set threshold P1ref are more easily determined, and whether there is a shortage of refrigerant is determined more easily.

The operation of determining whether there is a shortage of refrigerant, shown in FIG. 5 may be applied during initial refrigerant charging operation performed when the device is installed or during refrigerant recharging operation after the refrigerant has been discharged once for maintenance. This can save time of charging and reduce a workers load.

By making a determination using the evaluation value P indicating a capability of the subcooling heat exchanger 14 that detects a shortage of refrigerant, a change in temperature effectiveness due to an operation state is small. Thus, the set threshold Pref can be easily set, and a shortage of refrigerant can be detected at an early stage irrespective of operation states.

REFERENCE SIGNS LIST

1 refrigerating device 2a, 2b on-site pipe 2c, 2d refrigerant pipe 10 heat-source-side unit 10A compressor unit 10B condenser unit 11 compressor 12 condenser 12a fan 13 receiver 14 subcooling heat exchanger 15 injection circuit 16 flow rate regulator 20 load-side unit 21 decompressor 22 evaporator 30, 130 controller 31, 131 evaluation value calculation unit 32, 132 refrigerant amount detection unit 33 output control unit discharge pressure sensor 42 suction pressure sensor 43 outdoor air temperature sensor 44 inlet temperature sensor 45 outlet temperature sensor 46 intermediate pressure sensor 50 information output device 131a first evaluation value arithmetic unit 131b second evaluation value arithmetic unit P, P1 evaluation value Pref, P1ref set threshold P11 first evaluation value P12 second evaluation value P11ref first evaluation threshold P12ref second evaluation threshold Pm intermediate pressure Tin inlet temperature Tout outlet temperature

The invention claimed is:

1. A refrigerating device, comprising:
a refrigerant circuit in which a compressor in which an injection port is provided at an intermediate pressure part of the compressor, a condenser, a subcooling heat exchanger, a decompressor, and an evaporator are connected in this order with refrigerant pipes, the compressor compressing refrigerant, the condenser causing the refrigerant discharged from the compressor to reject heat and then cooling the refrigerant, the subcooling heat exchanger subcooling the refrigerant flowing out from the condenser, the decompressor decompressing the refrigerant subcooled by the subcooling heat exchanger, and the evaporator removing heat from the refrigerant decompressed and expanded by the decompressor and then evaporating the refrigerant;
an injection circuit that causes a portion of refrigerant branching from a path between the subcooling heat exchanger and the decompressor and that has then flowed out from the subcooling heat exchanger to flow into the injection port of the compressor;
the condenser is connected to the compressor with a first on-site pipe interposed therebetween and the condenser is connected to the subcooling heat exchanger with a second on-site pipe interposed therebetween,
an inlet temperature sensor configured to detect an inlet temperature of the refrigerant, which has flowed through the first on-site pipe and then the condenser, flowing through the second on-site pipe into the subcooling heat exchanger;
an outlet temperature sensor configured to detect an outlet temperature of the refrigerant flowing out from the subcooling heat exchanger toward the decompressor; and
a controller configured to control operation of the refrigerant circuit,
wherein the compressor, the subcooling heat exchanger, the inlet temperature sensor, and the outlet temperature sensor are provided inside a compressor unit, the condenser is provided inside a condenser unit, and the condenser unit and the compressor unit are separate units and spaced apart from one another,
and
the controller is configured to
calculate an evaluation value indicating a capability of the subcooling heat exchanger in accordance with the inlet temperature detected by the inlet temperature sensor wherein the evaluation value reflects pressure losses caused by refrigerant that passes through the first on-site pipe and the second on-site pipe, and the outlet temperature detected by the outlet temperature sensor; and
determine whether there is a shortage of refrigerant in accordance with the evaluation value.

2. The refrigerating device of claim 1,
wherein the controller calculates a temperature effectiveness of the subcooling heat exchanger as the evaluation value by using the inlet temperature, the outlet temperature, and an intermediate pressure, wherein the intermediate pressure is at or near the intermediate pressure part of the compressor.

3. The refrigerating device of claim 1, further comprising an outdoor air temperature sensor configured to detect a temperature of outdoor air with which heat is exchanged in the condenser,
wherein the controller calculates a temperature effectiveness of the subcooling heat exchanger as the evaluation value by using the inlet temperature, the outlet temperature, and the temperature of the outdoor air.

4. The refrigerating device of claim 1,
wherein the controller calculates a degree of subcooling in the subcooling heat exchanger as the evaluation value by using the inlet temperature and the outlet temperature.

5. The refrigerating device of claim 1,
wherein when the evaluation value falls below a set threshold, the controller determines that there is a shortage of refrigerant.

6. A refrigerating device, comprising:
a refrigerant circuit in which a compressor, a condenser, a subcooling heat exchanger, a decompressor, and an evaporator are connected in this order with refrigerant pipes, the compressor compressing refrigerant, the condenser causing the refrigerant discharged from the compressor to reject heat and then cooling the refrigerant, the subcooling heat exchanger subcooling the refrigerant flowing out from the condenser, the decompressor decompressing the refrigerant subcooled by the subcooling heat exchanger, and the evaporator removing heat from the refrigerant decompressed and expanded by the decompressor and then evaporating the refrigerant;

an injection circuit that causes a portion of refrigerant branching from a path between the subcooling heat exchanger and the decompressor and that has then flowed out from the subcooling heat exchanger to flow into the compressor;

the condenser is connected to the compressor with a first on-site pipe interposed therebetween and the condenser is connected to the subcooling heat exchanger with a second on-site pipe interposed therebetween, an inlet temperature sensor configured to detect an inlet temperature of the refrigerant, which has flowed through the first on-site pipe and then the condenser, flowing through the second on-site pipe into the subcooling heat exchanger;

an outlet temperature sensor configured to detect an outlet temperature of the refrigerant flowing out from the subcooling heat exchanger toward the decompressor; and a controller configured to control operation of the refrigerant circuit, wherein the compressor, the subcooling heat exchanger, the inlet temperature sensor, and the outlet temperature sensor are provided inside a compressor unit, the condenser is provided inside a condenser unit, and the condenser unit and the compressor unit are separate units and spaced apart from one another, and wherein the controller is configured to calculate a temperature effectiveness of the subcooling heat exchanger as a first evaluation value by using the inlet temperature wherein the temperature effectiveness reflects pressure losses caused by refrigerant that passes through the first on-site pipe and the second on-site pipe, the outlet temperature, and an intermediate pressure and calculate a degree of subcooling in the subcooling heat exchanger as a second evaluation value by using the inlet temperature and the outlet temperature, wherein the intermediate pressure is at or near the intermediate pressure part of the compressor, an injection port being provided at the intermediate pressure part, select either the first evaluation value or the second evaluation value and determine whether there is a shortage of refrigerant.

7. The refrigerating device of claim 1, further comprising an information output device that outputs information indicating a shortage of the refrigerant, wherein the controller causes the information output device to output the information indicating a shortage of the refrigerant when the controller determines that there is a shortage of refrigerant.

8. The refrigerating device of claim 1, wherein the refrigerant has a temperature glide.

9. The refrigerating device of claim 6, wherein the controller selects the first evaluation value when a pressure difference between saturation pressure converted from the inlet temperature and the intermediate pressure is a preset intermediate pressure threshold or greater, and selects a second evaluation value when the pressure difference between the saturation pressure and the intermediate pressure is smaller than the preset intermediate pressure threshold.

* * * * *